No. 772,636. PATENTED OCT. 18, 1904.
J. A. SWINEHART.
VEHICLE TIRE.
APPLICATION FILED MAY 13, 1904.
NO MODEL.

WITNESSES
R. B. Moser
H. M. Moser.

INVENTOR
James A. Swinehart
BY H. J. Fisher
ATTORNEY.

No. 772,636. Patented October 18, 1904.

UNITED STATES PATENT OFFICE.

JAMES A. SWINEHART, OF AKRON, OHIO.

VEHICLE-TIRE.

SPECIFICATION forming part of Letters Patent No. 772,636, dated October 18, 1904.

Application filed May 13, 1904. Serial No. 207,802. (No model.)

*To all whom it may concern:*

Be it known that I, JAMES A. SWINEHART, a citizen of the United States, residing at Akron, in the county of Summit and State of Ohio, have invented certain new and useful Improvements in Vehicle-Tires; and I do declare that the following is a full, clear, and exact description of the invention, which will enable others skilled in the art to which it appertains to make and use the same.

My invention relates to improvements in solid rubber tires for vehicle-wheels; and the improvement consists in the construction of a tire, substantially as hereinafter shown and described, and more particularly pointed out in the claims.

The development of the automobile and the increasing use of such vehicles has demonstrated the necessity of improvement in their wheel-tires. Primarily it is essential that a tire have a high degree of cushioning character to minimize the shock and jolt to the vehicle; but long life and durability and good traction qualities are other vital features to be considered, and a practical tire must have all of these. Safety to the occupants of a vehicle demands that a tire be non-collapsible or wherein the diameter of the wheel as a whole cannot be suddenly reduced when the machine is under motion, and this is an advantageous feature in favor of a solid rubber tire. A solid rubber tire wears well and stands up for a long period of time under the heaviest of loads and when driven at high speeds and makes the safest and most practical tire, providing that a high degree of cushioning character and a wide traction-surface is also present. My aim has been to provide a construction of tire wherein all the desired features are fully developed to bring out the advantages of each to the highest degree.

Figure 1:
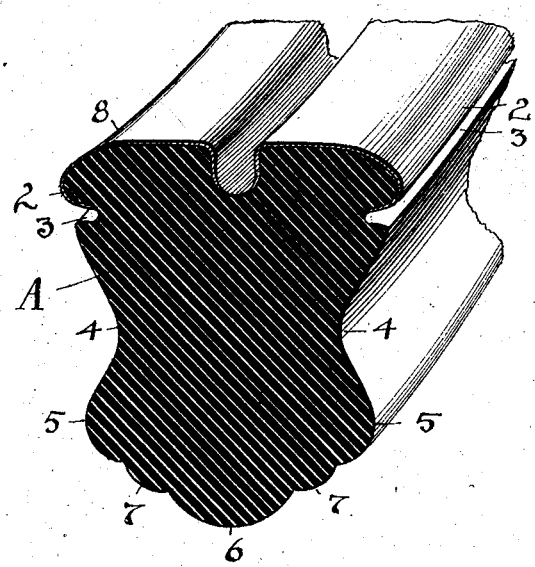
Figure 2:
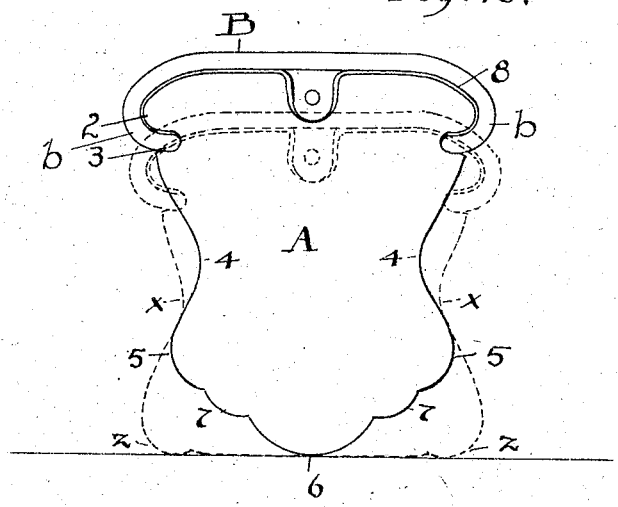

In the accompanying drawings, Figure 1 is a full-sized cross-section and perspective view of a portion of my improved tire; and Fig. 2 is a diagrammatic view, in full and dotted lines, illustrating the extreme differerences in load-carrying conditions.

A represents a solid tire which is preferably made of a high grade of gutta-percha and in the form shown is designed to be used with a vehicle-rim B, commonly known as a "clincher" tire-rim, and which is made with inturned edges $b$ to fit into a circumferential groove 3, formed in each side of tire A near its base or inner circumference. The base and side ribs 2 are preferably covered with a non-stretchable fabric 8 to prevent creeping and spreading of the tire at its base. The tread of tire A is convex or bulging, with rounded beads or ribs 6 and 7, which run around the full circumference of the tire, and the central rib 6 is preferably enlarged over the others and is designed to take the first thrust and blow against the tire in its travel on the roadway and in a measure to overcome the first resistance and shock of small obstructing objects or bodies without affecting the main body of the tire. This central rib flattens out immediately below the axis of the wheel and is lost more or less at this point under the weight carried, but finds itself front and rear at the normal diameter of the tread. The convexity of the tread under full load is changed from normal to a wide flat tread, such as is needed for good traction and driving purposes and as illustrated in dotted lines from Z to Z, Fig. 2, and rib or bead 6 is forced inward and tends to spread the tire between its sides. The elasticity or resiliency of the tire depends greatly upon its height and width, and the narrower the tire from side to side the better the results; but in this connection the tread must also be considered, as this should be of good traction width. To this end tire A has concave sides 4 to give the tire less body at its center, and thereby increase the cushioning effect while the tread is enlarged, and becomes even more so under load because of its convex form and bead 6, which extra stock forces out the sides, especially between points 5 5, Fig. 2, and in a measure also spreads the sides 4, and as illustrated at $x$ $x$, Fig. 2.

This construction provides a thoroughly practical tire wherein the combined advantages are all in perfect accord to produce a lively and elastic tire with a wide traction-surface, and which tire is especially adapted for long life and hard service under heavy loads.

What I claim is—

1. A tire for wheels comprising an elastic body solid throughout with concave sides and narrowed central portion and a convex tread-surface with an enlarged rib centrally about the circumference of the tread.

2. A tire of rubber constructed with a widened base and a widened tread and a solid central portion of narrower cross-section than said base and tread, said tread being convex in form and provided with ribs of varying sizes running circumferentially around the tire.

3. A tire for vehicle-wheels constructed with a widened base and a widened tread with a solid connecting portion of less width than said base and tread, a groove in the sides of the base of said tire and an enlarged rib running circumferentially about the center of the tread.

In testimony whereof I sign this specification in the presence of two witnesses.

JAMES A. SWINEHART.

Witnesses:
R. B. MOSER,
C. A. SELL.